Figure 1:
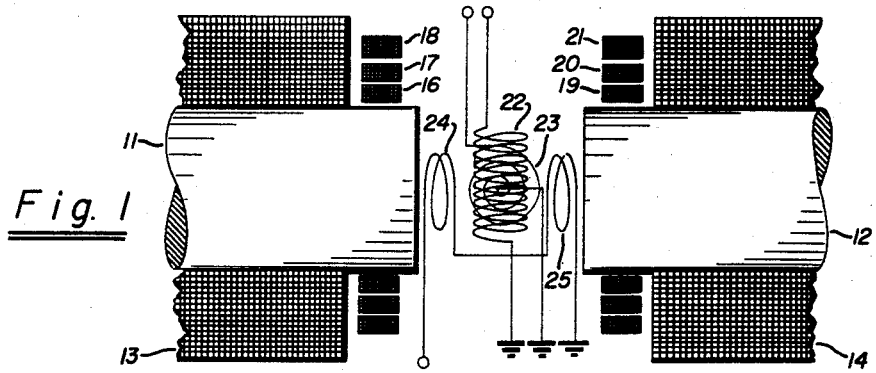

March 29, 1960 W. E. BELL ET AL 2,930,966

MAGNETIC FIELD STABILIZING METHOD AND APPARATUS

Filed Sept. 18, 1956 2 Sheets-Sheet 1

INVENTORS
William E. Bell &
Martin E. Packard
BY
Paul B. Hunter
Attorney

United States Patent Office 2,930,966
Patented Mar. 29, 1960

2,930,966

MAGNETIC FIELD STABILIZING METHOD AND APPARATUS

William E. Bell, Palo Alto, and Martin E. Packard, Menlo Park, Calif., assignors to Varian Associates, San Carlos, Calif., a corporation of California Application September 18, 1956, Serial No. 610,451

22 Claims. (Cl. 324—.5)

This invention relates in general to magnetic field control and measurement and more particularly to novel methods and apparatus utilized for the precise stabilization, control and/or measurements of magnetic fields.

There are many instances in which extremely precise magnetic fields are necessary, especially for use in scientific projects and experiments. For example, in the investigation of the chemical properties of substances by nuclear magnetic resonance it is necessary to produce a uniform unidirectional magnetic field to polarize the magnetic moments of the nuclei in the chemical substance under investigation. Such a magnetic field is typically of the order of 7,000–14,000 gauss. The three properties of prime interest in the design of a magnet for producing such large magnetic fields are the homogeneity of the magnetic field, the intensity of the field, and the stability of the field, both short- and long-time stability. For high resolution nuclear magnetic resonance experiments in physical chemistry at least a stability of about one part in ten million for a period of 30 seconds or more is necessary. The problem of making the magnetic field stable is primarily one of controlling external influences. For example, the magnetic field of permanent magnets is seriously affected by changes in room temperature, while electromagnets are also subject to changes in the current supplied from the associated D.C. power supplies. In addition, both permanent and electromagnets are seriously affected by stray fields and nearly moving objects such as metal chairs, tools, etc. The stability of one part in ten million for nuclear magnetic resonance work was extremely difficult to achieve, as illustrated by the fact that the pressure of one finger on a magnet yolk 6 inches by 12 inches in cross section produced a relatively large shift of the magnetic resonance signal.

Applicants have been able to substantially improve the stabilization of such a magnetic field by the use of special windings serving as a pickup coil to detect changes in total magnetic flux in the magnet poles. The signal detected in the pickup coil is transmitted through an integrator and amplifier system, whose resultant output current then being passed through another set of windings associated with the magnet called a buckout coil to produce flux changes which just compensate for the detected flux changes. This method is capable of improving the suppression of field variations, both internal and external, by a factor of from ten to one hundred or more. Utilizing this method of stabilization, it has been possible, for example, to obtain a stability of the order of one part in one hundred million over a period of several minutes or more while doing high resolution nuclear magnetic resonance investigations.

Also, it is desirable to accurately measure the changes in strength of magnetic fields accurately and rapidly. Applicants' novel invention provides a method and means for making such measurements.

It is, therefore, the object of the present invention to provide a novel improved magnetic field stabilization and/or measuring system.

One feature of the present invention is the provision of a stabilizing system for use in magnetic fields comprising a pickup coil associated with the magnetic field for detecting flux changes therein, an integrating amplifier system coupled to the pickup coil energized by the current induced therein due to the flux changes, said integrating amplifier producing a D.C. current output, and a buckout coil associated with the magnetic field to which said current is transmitted for producing a flux change which is equal and opposite to the flux change detected by the pickup coil.

Still another feature of the present invention is the provision of a novel method and apparatus for selecting and interconnecting a plurality of coil windings to produce a pickup coil and a buckout coil which both have a total moment which is equal, as viewed from a particular location in the magnetic field, so that a stable magnetic field may be obtained at the particular location in the magnet gap.

Another feature of the present invention is the provision of a novel method and apparatus for obtaining a very stable magnetic field in a magnet at a particular point of interest in the magnet gap which involves the physical positioning of at least a pair of coils in the magnetic field, one serving as a flux change pickup coil and the other as a buckout coil.

Still another feature of the present invention is the provision of a stabilizing system for use with an electromagnet having a main power supply for the electromagnet comprising first coil means associated with the magnet for detecting flux changes in the magnet, means including a second coil associated with the magnet operative in response to the detected flux changes for producing equal and opposite flux changes in the magnet, and a control means coupled to said latter means and coupled to said main power supply for additionally controlling the output of the power supply in response to the flux changes.

Still another feature of the present invention is the provision of a stabilizer control circuit for use with an electromagnet and its associated main power supply including a field shifting control circuit for regulating the output current from the main power supply, a flux stabilizing means comprising a pickup means for detecting flux changes in the magnet and a buckout means coupled through an integrating amplifier system to the pickup means for responding to said flux changes to produce offsetting flux changes in the magnet equal and opposite in direction to said detected flux changes, and means for effectively disabling said flux stabilizing means while operating the control circuit for changing the output current from said power supply.

Another feature of the present invention is the provision of a field stabilizer control circuit for use in a magnetic field including a flux stabilizing means comprising a pickup means for detecting flux changes in the magnetic field and a buckout means coupled through an integrating amplifier system to the pickup means for responding to said flux changes to produce offsetting flux changes in the magnetic field equal and opposite in direction to said detected flux changes, and a field shifting means coupled to said buckout means for introducing an electrical control signal therein for the purpose of producing an additional flux change in said magnetic field whereby the magnetic field may be changed or swept at a predetermined rate.

Still another feature of the present invention is the provision of a novel circuit means comprising a moving coil galvanometer coupled in an electrical circuit, the galvanometer responding to small current changes in the coil to produce a reading on the galvanometer scale and means including a D.C. generator coupled in said galvanometer coil circuit for producing a small D.C. current in said coil dependent on the direction of the movement of said D.C. generator armature.

Another feature of the present invention is the provision of a novel method and apparatus for measuring minute changes in magnetic fields by the utilization of a pickup means for detecting flux changes in the field, and integrating amplifier means for integrating and amplifying said flux changes and a buckout means responsive to the integrated signal for producing an equal and opposite flux change, the necessary energy needed for producing an opposing flux change serving to accurately measure the change in the magnetic field.

Figure 2:
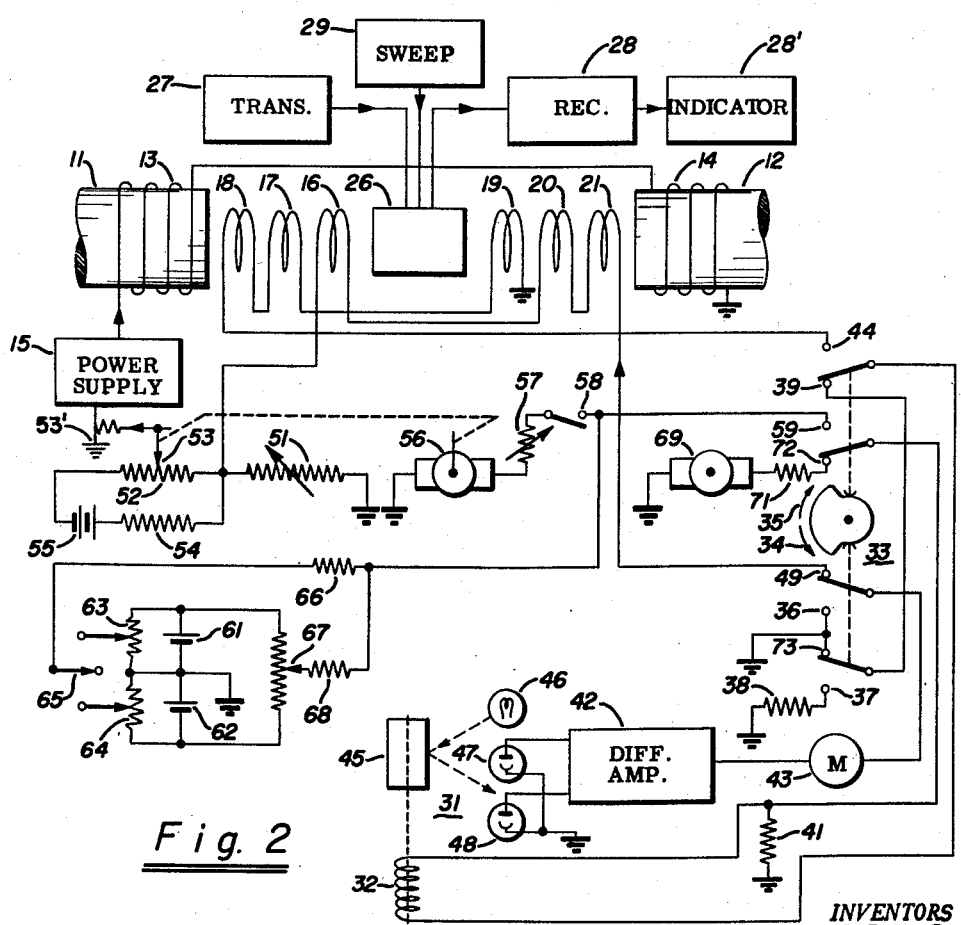
Figure 3:
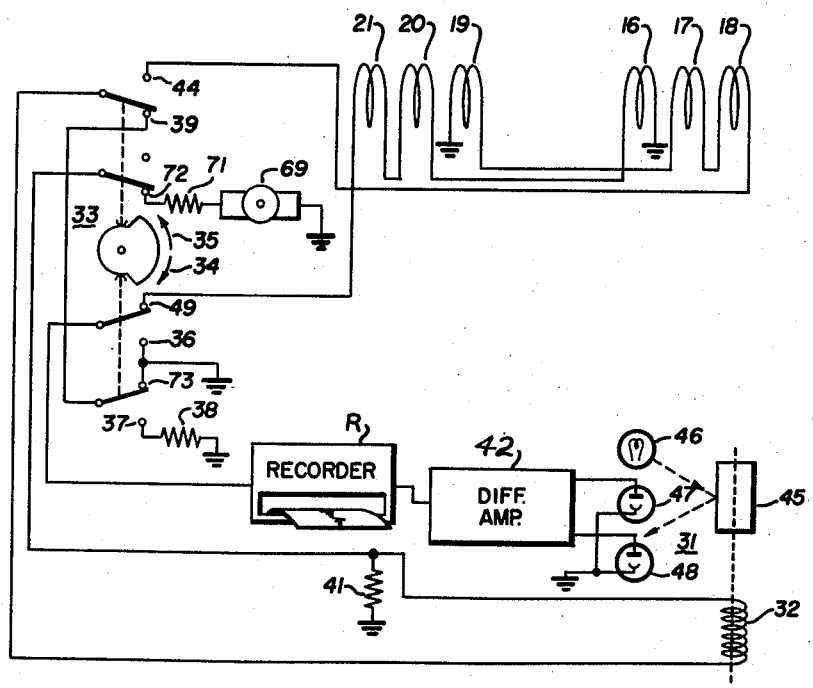

These and other features and advantages of the present invention will be more apparent after a perusal of the following specification taken in connection with the accompanying drawings wherein, Fig. 1 is a schematic drawing of an electromagnet partly in cross section having a plurality of windings for use as pickup and buckout coils mounted on the poles thereof and having a portion of the equipment necessary for nuclear magnetic resonance work positioned in the magnet gap, Fig. 2 is a schematic block diagram showing one novel system which embodies the present invention for the precise stabilization and control of the magnetic field produced by the electromagnet apparatus shown in Fig. 1, and Fig. 3 is a schematic block diagram of another system embodying the present invention utilized for measuring changes in the strength of a magnetic field.

Although the present magnetic field measurement and stabilization improvements disclosed and claimed herein will be explained with relation to their utilization in a nuclear magnetic resonance high resolution spectroscopy system, it should be understood that the invention relates to magnetic fields per se and is applicable to magnets used in various applications other than nuclear or gyromagnetic resonance.

Referring now to Figs. 1 and 2 there is shown an electromagnet including the two pole pieces 11 and 12 and the electrical coils 13 and 14 surrounding the pole pieces. The D.C. current for the electromagnet is supplied from a power supply 15 which has been constructed so as to be variable yet as stable as modern electronic techniques will permit. Two sets of three annular coils (16, 17 and 18, 19, 20 and 21) are mounted on the pole pieces 11 and 12 for use in forming pickup and buckout coils necessary for the precise stabilization of the magnetic field across the gap as will hereinafter be explained. Shown in the magnet gap in Fig. 1 are the mutually perpendicular radio frequency transmitter coil 22, radio frequency receiver coil 23 and a pair of sweep coils 24 and 25 which are familiar to those skilled in the crossed-coil nuclear magnetic resonance spectroscopy art. The coils 22, 23, 24 and 25 shown in the magnet gap in Fig. 1 are incorporated into a probe 26 in Fig. 2 to which is coupled the necessary transmitter circuit 27, receiver circuit 28, indicator 28' and sweep circuit 29. Since the nuclear magnetic resonance system is so well known in the art and is set out fully in the literature as evidenced by the U.S. Patent Reissue 23,950 issued to Felix Bloch and William W. Hansen on February 22, 1955, entitled "Method and Means for Chemical Analysis by Nuclear Inductions," no further description of this nuclear magnetic resonance art will be undertaken here. It will suffice to say that the necessary unidirectional magnetic field produced by the electromagnet must be of a sufficient strength to enable the production of nuclear magnetic resonance and, in order to produce the desired high resolution, must be extremely stable.

In the embodiment of the present invention shown in Fig. 2, coils 19, 17 and 18 are connected in series and are thus combined to serve as a pickup coil in which current is induced as a function of the flux changes in the pole pieces 11 and 12. Coils 16, 20 and 21 are also connected in series and are thus combined to serve as a buckout coil to which current is transmitted, responsive to the undesirable flux changes detected by the pickup coil, for inducing equal and opposite flux changes in the magnet poles necessary to offset said detected flux changes. The exact selection and inter-connection of the coils making up the pickup and buckout coils is a very important aspect of the present invention and will be described below in more complete detail. A galvanometer 31 is coupled to the output of the pickup coil and serves as the integrator in the transmission circuit between the pickup coil and the buckout coil. This galvanometer is of the moving-coil, reflecting mirror type in which the deflection of the galvanometer coil 32 is a measure of the current flow therethrough.

The present embodiment of this invention works in the following manner. A manually operated cam switch 33 controls a plurality of switch contacts and has three positions in which it may be set. The first position may be termed an "Initial Balance" position, this position being the lower position as indicated by the arrow 34 in the Fig. 2. The second or midpoint position may be termed a "Normal" or "Off" position in which the switch is normally found when the system is not being initially balanced or operated to investigate a chemical substance. The third or upper position is the "On" position in which the switch is positioned while the high resolution experiment is being performed and is represented by the arrow 35.

After the system is first energized and the electrical power supplied to all of the various stages and assemblies, it is necessary to initially balance the system and also the galvanometer to center it in its natural zero position. The necessity for this initial balancing will occur infrequently since once the system is initially balanced many nuclear magnetic resonance spectrums may be produced before there will occur a need for basic rebalancing. To perform this initial balancing, the cam switch 33 is manually moved to its downward or "Initial Balance" position at which time the switch contacts 36 and 37 are closed. A circuit may then be traced from ground through a critical damping resistor 38, the switch contacts 37 and 39, the galvanometer coil 32 and through galvanometer resistor 41 to ground. The galvanometer may then be adjusted manually in well known manner until the hairline on the meter is on zero, that is, at the center point of the galvanometer scale. In addition, the differential amplifier circuit 42 may be balanced so that the current through the microammeter 43 reads zero, also at the midpoint of the scale. The system is thereby initially balanced on a zero balance position and, with the chemical sample under investigation positioned within the probe 26, is ready for performing a high resolution nuclear magnetic resonance experiment.

During the high resolution experiment, the switch 33 is moved to its uppermost or "On" position. The pickup coil 19, 17, 18 is coupled through the contact switch 44 to the galvanometer coil 32 and through the galvanometer resistor 41 to ground. Therefore, the current induced in the pickup coil due to minute flux changes in the magnet poles 11 and 12 is transmitted through the galvanometer coil 32 and serves to rotate the galvanometer mirror 45 coupled to the coil 32. Light from a source 46 is reflected from the mirror 45 and is detected by a pair of photosensitive tubes 47 and 48. The current output from each of the two photosensitive tubes is proportional to the division of light between them as determined by the deflection of the mirror 45. With the galvanometer mirror centered, that is, with the galvanometer reading zero on the scale, the light is equally divided between the two photosensitive tubes such that their current outputs are equal. Deflection of the reflected light one way or the other results in an increase in one of the photosensitive tube outputs and a decrease in the other dependent on the distance and direction of the deflection. The outputs from these photosensitive tubes are coupled to the difference amplifier 42 which produces a D.C. output signal, the amplitude of which is dependent on the amplitude of the current induced in the pickup coil and transmitted to the galvanometer coil 32 and the sense of which is dependent on the direction of the current induced. This D.C. output from the differential amplifier 42 is coupled through the microammeter 43, switch contact 49, buckout coil 16, 20, 21 and through a relative low, variable resistor 51 to ground. In this manner the D.C. output of the differential amplifier 42 passes through the buckout coil and thus produces a flux change in the magnet pole pieces 11 and 12 which is opposite in direction and equal in amplitude to the flux change detected by the pickup coil.

It can thus be seen that flux changes produced in the magnet field due to various circumstances are detected by a pickup coil and are automatically compensated for by offsetting equal and opposite flux changes produced by the buckout coil. The current flow through the buckout coil will correct for a magnet field drift of approximately one gauss full scale. In addition to this, applicants have provided a feed-back to the main power supply 15 which transmits an error signal to the power supply responsive to current in the buckout coil to correct for much larger field drifts, for example, of the order of ten gauss. This feed-back circuit may be traced from one side of the variable resistor 51 through a field shift potentiometer 52 and its sliding contact 53 to the power supply 15. Variations in the potential drop across the resistor 51 due to current changes in the buckout coil 16, 20, 21 will serve to control the power supply, for example, by controlling the bias on an amplifier stage in the power supply, such that current output of the power supply 15 to the magnet coils 13 and 14 will vary proportionately. The input of the power supply 15 from the sliding contact 53 is provided with a low pass R–C network 53' so that only slow drift signals in the buckout coil are permitted to control or affect the power supply 15. In this manner, the magnetic field of the magnet 11, 12 is automatically varied by means of tuning the main power supply 15 to compensate for slow drift of the magnet flux, for example, over the range of about 10 gauss of magnetic field. The short-time or rapid drifts in flux are compensated for by the current flow in the buckout coil as explained above. The resistor 51 is variable so as to selectively control the gain of the feed-back to the power supply 15.

Also coupled into the control circuit of the magnet power supply 15 is a network comprising a resistor 54, battery 55 and the potentiometer 52. By adjustment of the sliding contact 53, a D.C. current may be supplied to the control circuit of the main power supply 15 of an amplitude and sense desired to increase or decrease the current flow to magnet coils 13 and 14 and thus the strength of the magnet's field. This provides a convenient method for manually adjusting or biasing the magnet field strength. When changing the magnet field strength by use of this D.C. control circuit, the pickup coil 17, 18, 19 senses a corresponding flux change and therefore has induced therein a current flow dependent on the amplitude and direction of the flux change. If this induced current is transmitted through the galvanometer coil 32 it would result in a rapid movement of the galvanometer off scale and an attempt by the galvanometer system to supply an offsetting or balancing current to the buckout coil. The applicants have provided a novel method for preventing such a false indication of flux change to the galvanometer system during changing of the magnet field which operates as follows. A small D.C. generator 56 is provided having its armature mechanically coupled to the magnet field shift sliding contact 53 such that movement of the sliding contact 53 results in a rotation of the armature of the generator 56. Thus, as the magnet field is varied by means of sliding contact 53, the generator 56 produces a unidirectional current which has a sense or direction dependent on the direction of the magnet field change and an amplitude which is proportional to the rate of change of the magnet biasing current and which continues for as long as the sliding contact 53 is being moved and the magnet field changed. This unidirectional current is transmitted from the generator 56 through a variable resistor 57, normally closed switch 58, and switch contact 59 to the galvanometer coil 32. Thus the generator 56 serves to produce an input signal to the integrator 31 which is the derivative of the magnet bias current. The value of resistor 57 is selected so that the unidirectional current produced in the galvanometer coil by the generator 56 is of a value equal to the unidirectional current delivered to the galvanometer coil 32 from the pickup coil 17, 18, 19, this latter current also being the derivative of the magnet bias current and of opposite sense to the input signal from the generator 56. The resultant current in the galvanometer coil is zero and thus the operator-induced change in the magnet field strength is not noticed by the galvanometer system. When the operator ceases to adjust the magnet field by moving the contact 53, the unidirectional current from the generator 56 ceases. The switch 58 is provided for use should the adjusted value of resistor 57 be such that the unidirectional current produced by the generator 56 is not exactly of the proper value to precisely offset the current induced in the galvanometer system due to the magnet flux changes, resulting in a movement of the galvanometer scale off-center in one direction or the other. This would not ordinarily result unless the magnet field were being changed an appreciable amount. However, should the galvanometer move in response to the magnet field adjustment, the switch 58 may be opened and the sliding contact 53 moved in a direction to cause the current induced in the pickup coil 17, 18, 19 to move the galvanometer to center scale. During this period no off-setting D.C. current is transmitted from the generator 56 to the galvanometer coil 32. After centering, the switch 58 may again be closed and the magnet field adjusting resumed with the field control 53.

In the high resolution nuclear magnetic resonance spectroscopy art it is necessary to sweep through a magnetic line width in order to observe the magnetic resonance spectrum. The sweep is normally provided by the audio frequency sweep generator 29 and associated sweep coils 24 and 25 located in the magnet gap. The applicants have provided a novel sweep system utilizing the galvanometer and associated circuitry for producing a very precise, variable rate sweep for sweeping the unidirectional magnet field over the desired linewidth. This novel sweep circuit includes two batteries 61 and 62, potentiometers 63 and 64, and a three position switch 65 connected in a circuit with the galvanometer coil 32. The three positions on the selector switch 65 are an "Off" position (midpoint) in which no D.C. current is supplied to the galvanometer coil 32 from this circuit and two "On" positions, one of which may be termed a "Magnet Field Increase" position and the other of which may be termed a "Magnet Field Decrease" position. When a galvanometer controlled sweep of the magnet field is desired, the switch is turned to the increase or decrease position depending on whether the magnetic field is to be swept in an increasing or decreasing magnetic field direction. This results in the introduction of a small D.C. current in the galvanometer coil, the circuit for which may be traced from the switch contact 65 through resistor 66 and switch contact 59 to the coil 32. The galvanometer then rotates slowly and produces a slowly changing output current through the buckout coil 16, 20, 21 to produce the slow magnet field sweep. The potentiometers 63 and 64 are provided so that the rate of the sweep may be selected by the operator and changed as desired. In one embodiment constructed in accordance with this invention, the sweep rate was variable from .01 milligauss per second to about 12 milligauss per second or more as desired and the time length of the sweep through a nuclear magnetic resonance spectrum was variable from one second to 3 minutes.

It should be obvious to those skilled in the art that the sweep switch and rate control switches could be placed under the automatic control of a continuously operating device such as a clock-controlled mechanism whereby continuous back-and-forth sweeping may be obtained along with time-selected rate changes whereby continuous nuclear magnetic resonance spectrums may be produced as, for example, in flowing chemical processes.

As stated above, any flux changes in the magnet pole pieces which produce a current in the galvanometer coil will result in a buckout current being produced in the buckout coil to offset the flux change. However, the galvanometer may be caused to drift by reasons other than a flux change in the magnet poles. For example, steady minute D.C. currents may be produced in the galvanometer coil circuit due to thermoelectric potentials produced from soldered terminals or due to temperature changes of the system. These D.C. currents cause a very slow steady rotation of the galvanometer coil and thus a slow drift of the magnet field. A drift control circuit is provided comprising the batteries 61 and 62 and a potentiometer 67 and resistor 68 coupled in the galvanometer coil circuit for producing a D.C. current having an amplitude and sense, as desired and selected by the position of the sliding contact of potentiometer 67, which is just sufficient to offset the undesired D.C. current in the coil 32 causing the slow drift of the galvanometer and magnet field.

The operator may find it necessary from time to time to balance the very sensitive galvanometer. To do this, the operator moves the cam switch 33 to its midpoint or "Normal" position. A circuit may then be traced from a small manually operated D.C. generator 69 through a resistor 71, switch contact 72, galvanometer coil 32 and switch contacts 39 and 73 to ground. By manually turning the armature of the D.C. generator 69 a small D.C. current of a desired direction is produced to center the galvanometer on its zero position.

To give an example of high resolution nuclear resonance work before utilization of the present invention, an ethyl alcohol spectrum was produced by a typical nuclear magnetic resonance system before the adaptation of the stabilizing system of the present invention. The three major proton peaks were fairly well resolved and one could identify the fine structure due to spin-spin interactions. The spectrum was obtained at a field of approximately 7,050 gauss at an R.F. of 30 megacycles for protons. The time of sweep was approximately 5 seconds, this short duration being necessary due to minute time instabilities in the polarizing D.C. magnetic field. When the operator attempted to lengthen the time of the sweep, the ethyl alcohol spectrum deteriorated due to the minute time instabilities.

An ethyl alcohol spectrum was then obtained with the nuclear magnetic resonance spectrometer system incorporating the novel stabilizer system of the present invention. The operating conditions were identical to those present during the run of the previous spectrum with the exception that the inventors were able to increase the sweep time to 3½ minutes. Due to the slow sweep through resonance the fine splitting of the spectrum was detectable since the magnet field was held stabilized over the entire period of the run. Subsequent runs up to ten minute sweep time have been accomplished with excellent resolution of the nuclear resonance signal.

As mentioned above, the exact selection and interconnection of the windings making up the pickup and buckout coils play an important part in obtaining the optimum stabilization of the magnetic field. From the standpoint of construction, the easiest way to assemble this stabilization system is to utilize one winding on one pole as a pickup coil and one winding on the opposite pole as a buckout coil. However, this simple scheme produces an over-compensation and under-compensation at selected points in the magnetic field. To further explain, a pickup coil detects a flux change in its vicinity over the cross-section of the magnet pole. The feedback current in the buckout coil produces an opposing flux change over the magnet cross section which just opposes the over-all flux change detected by the pickup coil. However, with relation to any one incremental area in the field, the feedback produced flux change may over-compensate or under-compensate for the actual flux change at this particular point. In addition, due to the fact that the mutual inductive coupling of the coils is a complex function, because of the characteristics of the high permeability material of the pole pieces, the moments of the coils differ and the stabilization at any one point in the magnet field may vary appreciably as the frequency of the flux changes detected by the pickup coil vary, unless the interconnection of the windings is properly selected. To correct for these circumstances, the present inventors utilize the following method for obtaining the optimum magnetic field stabilization. A point of prime interest in the magnet field gap is selected, for example, the point midway between the two pole faces and at the axial center of the pole pieces. At this point it is desired that the stability of the magnetic field be at an optimum during flux changes and regardless of the frequency of the flux changes in the magnet. A nuclear resonance sample is positioned at this point and the necessary radio frequency magnetic field applied thereto to create a nuclear magnetic resonance of the sample. The nuclear magnetic resonance is detected by the receiver coil 23 and associated receiver circuitry 28 in well-known manner and is displayed on the cathode ray oscilloscope of the indicator 28'. With the magnet field maintained as constant as possible so that the resonance is set at a particular point on the slope of the resonance curve, a random signal is applied to the magnet yoke or coils 13, 14 to simulate an instability of varying frequency in the magnet field. The beam on the cathode ray scope is observed and, unless the pickup coil windings and buckout coil windings are selected so as to have equal moments as seen from the prime interest point, the cathode beam will fluctuate up and down on the resonance curve denoting a change in the resonance brought on by a change in the magnetic field strength at said prime interest point. By trial and error the coils may be interconnected, for example, one coil on one pole piece may be serially connected with two coils on the opposite pole piece to serve as a pickup coil and the remaining windings coupled in series to serve as the buckout coil as shown in Fig. 1, until such time as the beam on the cathode ray tube ceases to fluctuate or fluctuates at a minimum indicating that the total moment of the pickup coil is equal to the total moment of the buckout coil relative to the selected point in the magnet gap. Of course, at some other point in the magnet field the field stability may not be at an optimum with this particular choice of buckout coil and pickup coil interconnection but the coils may be reconnected to obtain the optimum stability at that particular point, if desired. Thus, by proper selection and/or variation of the total moment of the pickup and buckout coils, a stable flux may be obtained at a specified position in the magnet gap.

Another method for accomplishing this result while watching the nuclear resonance signal on the oscilloscope is to utilize one or more windings for each of the buckout and pickup coils and physically moving the coils relative to each other and to the magnetic field until the desired stabilization at the prime interest point is obtained. Still another method is to regulate the current distribution in the pickup and buckout coils by means of, for example, shunting the individual windings until the proper stabilization, as noted by the resonance signal on the oscilloscope, is obtained.

Referring now to Fig. 3 there is shown in schematic block diagram form a portion of the novel apparatus disclosed in Fig. 2, this portion serving as a very sensitive tool for accurately measuring changes in the strength of the magnetic field. Similar apparatus in Fig. 3 bears the same reference numerals as its equivalent apparatus in Fig. 2. The pickup windings 17, 18 and 19 and the buckout windings 16, 20, and 21 are positioned in the magnetic field in which one wants to measure the field changes. Changes in the flux will induce a signal in the pickup windings 17, 18, 19 which is transmitted to the galvanometer coil 32 through switch contacts 44 in the manner explained above resulting in a movement of the reflecting mirror 45 of the galvanometer. This galvanometer movement results in an output signal from the differential amplifier 42 which is transmitted through a recording apparatus R and through switch contacts 49 to the buckout windings 16, 20, 21 to produce a magnetic flux equal and opposite to the detected magnetic flux. Since the output from the differential amplifier 42 is directly dependent on the measure of flux change in the magnetic field, the recording produced by the recorder R will be an accurate indication of the changes in the magnetic field of interest. The operation of switch 33 for use in balancing the galvanometer, etc., is similar to that described above with reference to Fig. 2 and need not be repeated. This device is very sensitive to changes in a magnetic field and will reproduce accurately relatively rapid changes in the field.

Since various modifications may be made in the above described method and apparatus without departing from the spirit of the invention, it is intended that the foregoing description is to be considered as exemplary and not in a limiting sense.

What is claimed is:

1. The method for improving the stabilization of a magnetic field stabilizing system of the type which utilizes a pickup coil coupled to the magnetic field having signals induced therein in response to flux changes in said field and integrating amplifier means coupled to said pickup coil for integrating said signals, the output of said integrating amplifier means coupled to a buckout coil for producing flux changes in said magnetic field in opposition to said detected flux changes which comprises the steps of providing a plurality of separate windings coupled to said magnetic field for use in making up said pickup and buckout coils, selecting a point of prime interest in said magnetic field and positioning a magnetic field measuring means at said point, inducing a flux change in said magnetic field for detection by said pickup coil, and coupling together certain ones of said plurality of windings to serve as said pickup coil and certain other ones of said plurality of windings to serve as said buckout coil, the buckout and pickup windings being chosen and intercoupled such that the flux change produced by said buckout coil results in a magnetic field at said prime interest point which most closely equals and opposes the magnetic field change at said prime interest point produced by said induced flux changes.

2. The method for improving the stabilization of a magnetic field stabilizing system of the type which utilizes a pickup coil positioned in the magnetic field having signals induced therein in response to flux changes in said field and integrating amplifier means coupled to said pickup coil for integrating said signals, the output of said integrating amplifier means coupled to a buckout coil in said magnetic field for producing flux changes in said magnetic field in opposition to said detected flux changes, said method comprising the steps of providing a plurality of separate windings in said magnetic field, coupling together a first plurality of said windings in series to serve as the pickup coil and coupling together a second plurality to serve as the buckout coil, selecting a point of prime interest in said magnetic field and positioning a magnetic field measuring apparatus for measuring said magnetic field at said point, inducing a flux change in said magnetic field which produces a signal in said first plurality of windings which is transmitted through said integrating amplifier to said second plurality of windings for producing a compensating flux change, observing the resultant change in said magnetic field as noted by said field measuring instrument, and selecting a proper combination of said plurality of windings to serve as said pickup coil and another plurality of said windings to serve as said buckout coil which results in said magnetic field measuring device detecting the smallest possible magnetic field change at said prime interest point produced by said induced flux change.

3. The method for improving the stabilization of a magnetic field stabilizing system as claimed in claim 2 wherein said field measuring apparatus positioned at said prime interest point comprises a gyromagnetic resonance apparatus producing a gyromagnetic resonance in said magnetic field, said method further comprising adjusting the resonance signal from said field measuring apparatus such that the resonance is set on the slope of the resonance curve, fluctuations in the magnetic field at said prime interest point resulting in fluctuations of the resonance along said slope, decreases in the fluctuations of the resonance along said slope indicating decreases in the fluctuations in the magnetic field strength at said prime interest point.

4. The method for improving the stabilization of a magnetic field stabilizing system of the type which utilizes a pickup coil positioned in the magnetic field having signals induced therein in response to flux changes in said field and integrating amplifier means coupled to said pickup coil for integrating said signals, the output of said integrating amplifier means being coupled to a buckout coil in said magnetic field and producing flux changes in said magnetic field in opposition to said detected flux changes which comprises the steps of providing a plurality of separate windings in said magnetic field, coupling together certain of said windings in series to serve as the pickup coil and certain others of said windings in series to serve as the buckout coil, selecting a point of prime interest in said magnetic field and positioning a magnetic field measuring apparatus for measuring said magnetic field at said point, inducing a flux change in said magnetic field which produces a signal in said certain windings forming the pickup coil which is transmitted through said integrating amplifier to said certain other windings for producing a compensating flux change, observing the resultant change in said magnetic field as noted by said field measuring instrument, and physically moving certain of said windings making up said pickup and buckout coils while observing said field measuring instrument to detect the physical position of said certain windings which results in said magnetic field measuring device detecting the smallest possible magnetic field change at said prime interest point produced by said induced flux change.

5. The method for improving the stabilization of a magnetic field stabilizing system utilizing pickup windings positioned in the magnetic field having signals induced therein in response to flux changes in said field and integrating amplifier means coupled to said pickup windings for integrating said signals, the output of said integrating amplifier means coupled to additional buckout windings in said magnetic field and producing flux changes in said magnetic field in opposition to said detected flux changes which comprises the steps of providing a plurality of separate windings in said magnetic field, coupling together certain of said windings to serve as the pickup coil and certain others of said windings to serve as the buckout coil, selecting a point of prime interest in said magnetic field and positioning a magnetic field measuring apparatus for measuring said magnetic field at said point, inducing a flux change in said magnetic field which produces a signal in said pickup coil which is transmitted through said integrating amplifier to said buckout coil for producing a compensating flux change, observing the resultant change in said magnetic field as noted by said field measuring instrument, and electrically interconnecting certain of said windings in said pickup and buckout coils so as to properly select the current distribution in said windings while observing said magnetic field measuring device to determine the current distribution which results in said magnetic field measuring device detecting the smallest possible magnetic field change at said prime interest point produced by said induced flux change.

6. Apparatus for controlling the D.C. output current of a power supply utilized to produce the necessary flux in an electromagnet producing a unidirectional magnetic field comprising a first inductive coil means adapted for coupling to said electromagnet for detecting flux changes in the electromagnet, an integrator system coupled to said first coil means for producing an output signal dependent on the flux changes detected by said first coil, a second inductive coil means adapted for coupling to the electromagnet and coupled to the output of said integrator circuit for producing a flux change in the electromagnet of a sense and amplitude to offset the flux change detected by said first coil means and thus maintain the magnetic field of said electromagnet stable, and a control means adapted for coupling to said integrator means and coupled to said power supply for additionally controlling the output of the power supply in response to the flux changes detected by said first inductive coil means.

7. Apparatus for controlling the D.C. output current of a power supply utilized to produce the necessary flux in an electromagnet producing a unidirectional magnetic field comprising a first inductive coil means adapted for coupling to said magnet having electrical energy induced therein proportional to flux changes in the electromagnet, an integrator system coupled to said first coil means for receiving the electrical energy induced in said first coil means due to said flux changes and integrating said energy, a second inductive coil means associated with said electromagnet and coupled to the output of said integrator, said second coil means receiving output signals from said integrator and inducing a flux which compensates said flux change detected by said first coil means, and circuit means adapted for coupling the second coil means to said power supply for transmitting a control electrical energy in accordance with the electrical energy in said second coil means to said power supply to control the D.C. current flow to said electromagnet for further controlling the flux changes in said electromagnet.

8. Apparatus as claimed in claim 7 wherein said circuit means coupled to said second coil means comprises an impedance element coupled to said second coil means having a potential produced thereacross proportional to the electrical energy in said second coil means and a feed-back circuit coupling said impedance element and said power supply for transmitting electrical energy proportional to said potential to said power supply for controlling the D.C. output of said power supply.

9. Apparatus as claimed in claim 8 including a magnet field control circuit coupled in said feed-back circuit comprising a source of potential and means for transmitting electrical potential from said source in a variable manner to said power supply for controlling the D.C. output current of said power supply.

10. Apparatus for controlling the D.C. output current of a power supply utilized to produce the necessary flux in an electromagnet producing a unidirectional magnetic field including a magnet stabilizing system comprising a first inductive coil means adapted for coupling to said magnet having electrical energy induced therein in response to and in accordance with the flux changes in the magnet, an integrator system coupled to said first inductive coil means for receiving electrical energy induced therein due to said flux changes and integrating said energy, and a second inductive coil means adapted for coupling to said magnet and coupled to the output of said integrator, said second inductive coil means receiving output signals from said integrator and inducing a flux change in said magnetic field compensating the flux change detected by said first inductive coil means, field shifting means adapted for coupling to said power supply for changing the D.C. current output to said electromagnet whereby the strength of the magnetic field may be varied, and means coupling said field shifting means to said stabilizing system and operated in synchronism with said field shifting means for disabling said stabilizing system during variation of said power supply.

11. Apparatus for controlling the D.C. output current of a power supply utilized to produce the necessary flux in an electromagnet producing a unidirectional magnetic field comprising a first inductive coil adapted for coupling to said electromagnet having electrical energy induced therein proportional to the flux changes in the electromagnet, an integrator system comprising a moving coil, reflecting mirror galvanometer, circuit means coupling said first inductive coil to the moving coil of said galvanometer, said integrator system integrating the energy induced in said first inductive coil, a second inductive coil adapted for coupling to said electromagnet and coupled to the output of said integrator system, said second coil receiving output signals from said integrator system and inducing flux changes in said electromagnet compensating the flux change detected by said first inductive coil, adjusting means adapted to be coupled to said power supply for changing the D.C. current output to said electromagnet whereby the strength of the magnetic field may be varied, and a D.C. current producing means coupled to said adjusting means and operated in synchronism therewith for producing a D.C. current flow in said galvanometer coil of an amplitude and sense to compensate for the current induced in said galvanometer coil from said first inductive coil due to the change in the magnetic field strength of said electromagnet responsive to said power supply variation.

12. The combination as claimed in claim 10 including a D.C. meter coupled in the circuit of said second inductive coil for indicating the current flow in said second coil.

13. The combination as claimed in claim 10 wherein said means for producing the D.C. current comprises a D.C. generator, the armature of which is coupled to the variable adjusting means and is rotatable therewith for producing the desired D.C. current.

14. The combination as claimed in claim 10 including switching means for preventing the flow of D.C. current from said D.C. current producing means to said galvanometer coil.

15. The combination as claimed in claim 11 comprising a variable impedance means coupled to said D.C. current producing means for controlling the strength of the D.C. current therefrom.

16. A field stabilizer system for stabilizing a magnetic field comprising a first inductive coil means coupled to said magnetic field for detecting flux changes in the magnetic field, an integrator circuit coupled to said first inductive coil means for producing an output dependent on the flux changes detected by said first inductive coil, a second inductive coil means coupled to said magnetic field and coupled to the output of said integrator system whereby flux is produced by said second inductive coil means of a sense and amplitude to offset the flux change detected by said first inductive coil means whereby the magnetic field may be stabilized, and a field shifting means coupled to said integrator system for introducing an additional electrical energy signal into said integrator system for the purpose of producing an additional signal in said second inductive coil means for changing the flux of said magnetic field responsive to and in accordance with said electrical energy signal whereby the magnetic field may be changed.

17. Apparatus for controlling the flux in a magnet producing a undirectional magnetic field comprising a first inductive coil adapted to be coupled to said magnet having electrical energy induced therein proportional to flux changes in the magnet, an integrator system comprising a moving-coil, reflecting mirror galvanometer, circuit means coupling said first inductive coil to the coil of said galvanometer, said integrator system integrating the energy induced in said first inductive coil, a second inductive coil adapted to be coupled to said magnet and coupled to the output of said integrator system, said second coil receiving output signals from said integrator system and inducing flux changes in said magnet to compensate for said flux changes detected by said first inductive coil to thereby stabilize the magnetic field of the magnet, and a source of a D.C. current potential adapted to be coupled to said galvanometer coil so as to provide thereto electrical energy of a desired sense and amplitude, the resultant integrated output signal being transmitted to said second inductive coil so that the flux of said magnet may be changed responsive to and in accordance with the D.C. potential applied to said galvanometer coil to thereby sweep the magnetic field through a desired range of magnetic field strength.

18. Apparatus for detecting minute changes in the field strength of a magnetic field which comprises a first inductive coil means adapted to be positioned in said magnetic field for detecting flux changes therein, an integrating amplifier system coupled to said first inductive coil means which integrates the derivative of the field changes transmitted thereto and produces an output signal dependent on the flux changes detected by said first coil means, a second inductive coil means adapted to be positioned in said magnetic field and coupled to the output of said integrating amplifier system for producing a flux change in the magnetic field of a sense and amplitude to offset the flux change detected by said first coil means, and an indicating means coupled to the output of said integrating amplifier for indicating the amplitude and sense of the electrical energy transmitted to the second inductive coil means for producing the necessary offsetting flux, said electrical energy serving as an accurate measurement of changes in the magnetic field.

19. Apparatus as claimed in claim 18 wherein said integrating amplifier means comprises a moving coil, reflecting mirror galvanometer system in which the moving coil is coupled to the first inductive coil means.

20. A magnet stabilizing system for controlling the flux in a magnet comprising first inductive coil means adapted to be coupled to said magnet having electrical energy induced therein in variable accordance with the flux changes in the magnet, an integrator system including an integrating means coupled to said first inductive coil means for receiving electrical energy induced therein due to said flux changes and integrating said energy and further including means providing an energy output responsive to and dependent in sense and amplitude on said induced energy, a second inductive coil means associated with said magnet and coupled to the output of said integrator system, said second inductive coil means receiving output signals from said integrator system and inducing a flux change in the magnet compensating the flux change detected by said first inductive coil means, field shifting means coupled to said second inductive coil means for supplying a unidirectional current to said second inductive coil means whereby the strength of the magnetic field may be varied, and means coupling said field shifting means to said stabilizing system and operated in synchronism with said field shifting means for rendering said integrating system substantially insensitive to electrical energy received from said first inductive coil means during variation of said field shifting means.

21. A magnet stabilizing system as claimed in claim 20 wherein said means coupling said field shifting means to said stabilizing system comprises a circuit for producing an electrical energy signal substantially equal in amplitude and opposite in sense to the electrical energy signal received from said first inductive coil means whereby the signals are canceled such that the integrator system detects no change in the magnetic field.

22. The system as claimed in claim 20 wherein said means coupling said field shifting means to said stabilizing system comprises a D.C. generator coupled to the field shifting means and operable therewith for producing the desired unidirectional current.

References Cited in the file of this patent

UNITED STATES PATENTS

| | | |
|---|---|---|
| 2,589,494 | Hershberger | Mar. 18, 1952 |
| 2,752,564 | Ryerson | June 26, 1956 |
| 2,776,403 | Anderson et al. | Jan. 1, 1957 |